United States Patent Office

3,410,757
Patented Nov. 12, 1968

3,410,757
GALACTOSE TEST COMPOSITION AND METHOD
Joseph W. Fraser, Dunlap, Ind., assignor to Miles Laboratories, Inc., Elkhart, Ind., a corporation of Indiana
No Drawing. Filed June 30, 1966, Ser. No. 561,694
14 Claims. (Cl. 195—103.5)

The present invention relates to new and improved test compositions and processes and is particularly concerned with enzymatic test compositions and processes useful for the qualitative detection and quantitative determination of galactose in biological fluids, food extracts and ingested liquids. In one of its more particular aspects it relates to stabilized galactose test compositions. In another of its more particular aspects it relates to such galactose test compositions incorporated with a carrier member.

Galactose is one of the naturally occurring aldohexoses. When ingested, it is normally absorbed from the intestines and converted into glucose which is assimilated by the tissues. In certain abnormal conditions, such as hepatic insufficiency and inborn errors of metabolism, galactose is not completely converted into glucose and is disposed of by excretion in the urine.

Clinical testing for hepatic failure and other abnormal conditions associated with an elevated galactose concentration in body fluids such as urine and blood has most often involved the use of certain complex, time-consuming and often non-specific tests for the presence of galactose in such fluids.

Recently, however, it has been found that galactose may be rapidly determined by utilizing, in the presence of oxygen, a relatively specific enzyme, galactose oxidase, to catalyze the conversion of galactose to hydrogen peroxide and, it is believed, a dialdehyde. The stoichiometric relation and subsequent estimation of the hydrogen peroxide formed in this reaction make this analytical scheme quantitative, or if desired, the hydrogen peroxide may merely be detected to effectuate a qualitative test for galactose. For purposes of convenience, the term "detection" as used hereinafter refers to and is defined as the quantitative estimation of galactose as well as the qualitative testing therefor.

In addition to galactose oxidase, these prior art tests for galactose usually include a substance having peroxidative activity, such as peroxidase, which catalyzes the response of an indicator material, such as o-tolidine, to the hydrogen peroxide formed in the galactose degradation. These and other test composition constituents, such as a buffer to maintain the test system within a certain optimum pH range will be elucidated more fully hereinbelow.

However, these prior art enzymatic compositions and devices for the detection of galactose suffer from the disadvantage of being relatively unstable under certain preparation and storage conditions, which instability would seriously detract from the commercial value of the product.

It is therefore an object of the present invention to provide an improved, stable enzymatic test composition and process for detecting galactose in fluids.

It has now been found that these and other objects, which will become apparent from the ensuing disclosure and the appended claims, are accomplished by adding either ascorbic acid or glucose or mixtures thereof to the aforenoted test compositions.

The material having the ability to catalyze the degradation of galactose is a rather specific enzyme, galactose oxidase, and may be prepared by various fermentation methods. Such an enzyme is operative in the presence of oxygen to specifically catalyze the oxidation of galactose to the aforementioned reaction products, hydrogen peroxide and a dialdehyde. The value of such a material resides in its specificity for galactose and thus enables a detection of galactose in the presence of other sugars such as glucose.

The material having peroxidative activity, is and as used herein is defined as, any material which catalyzes the response of an oxidation-reduction indicator to the hydrogen peroxide formed in the catalytic oxidation of the galactose. Generally this material comprises peroxidase which may be derived from several natural sources, such as horseradishes, potatoes, fig tree sap, turnips and white blood corpuscles. In addition to peroxidase, various other substances show peroxidative activity. Such substances include hemin, methemoglobin, oxyhemoglobin, hemoglobin, hemochromogen, alkaline hematin, urohemin, a combination of water soluble molybdate and iodide salts, and the like.

For purposes of convenience, the peroxidases, and other such substances having the above described activity will hereinafter be referred to as materials having peroxidative activity, although it is understood that these materials may not all function in the same manner. Such materials having peroxidative activity therefore, by definition, include substance which catalyzes or enhances the response of an indicator to hydrogen peroxide, although in the practice of the present invention the material having peroxidative activity may contribute to the system in other ways.

Of the indicator materials which are found to be utilitarian in the present invention, those substances which are responsive to the presence of hydrogen peroxide in the presence of the substance having peroxidative activity are within the contemplation of the present invention. A single indicator may be utilized, but if a response is desired which changes from one color to another upon a change in concentration of galactose in the fluid being tested, a plurality of indicators may be called for. Such indicators include, for example, benzidine, various benzidine derivatives such as o-tolidine and o-dianisidine, gum guaiac, 2,7-diaminofluorene, and the like.

In order to produce a test having the desired stability, reactivity and sensitivity it is important that the aforementioned ingredients when contacted with the fluid being tested be buffered at a hydrogen ion concentration of about from pH 5.5 to pH 8.0. Preferably an approximately neutral pH should be utilized, for example, one in the range of about from pH 6.8 to pH 7.2. Of the numerous buffers which may be utilized to maintain the pH of the ingredients within the desired range, it has been found that phosphate buffers and those buffers which consist of a weak inorganic acid such as boric acid or an organic polycarboxylic acid such as glutamic acid in combination with tris (hydroxymethyl) amino methane to form the corresponding tris (hydroxymethyl) methylammonium salt produce results which, both with respect to stability and sensitivity, are quite acceptable. In addition to the above, other acid salts of tris (hydroxymethyl) amino methane which may be used include tris (hydroxymethyl) methylammonium phthalate, tris (hydroxymethyl) methylammonium malonate and tris (hydroxymethyl) methylammonium citrate.

Wetting agents or surface active agents may be used in the compositions of this invention to assure an even distribution of the ingredients when these compositions are used to impregnate bibulous carriers, such as filter paper, to produce the so-called "dip-and-read" test strips or sticks. Various types of wetting agents may be used for this purpose including cationic, anionic and non-ionic varieties. Exemplary of the wetting agents which may be used are bis(2-ethylhexyl) sodium sulfosuccinate and polyoxyethylene sorbitan mono-oleate. Wetting agents are not essential, but their use contributes desired elegance to test strips made from the compositions of this invention.

In preparing the compositions of the present invention it has been found that the various constituents may be varied over a relatively wide range of concentrations. Generally, however, the following ranges of ingredient proportions in 100 ml. of solution may be considered preferable:

Galactose oxidase[1] _____units__ 10,000–30,000
Substance having peroxidative activity ___mg__ 1–20
Indicator material _____mg__ 10–100

[1] Since the activity of galactose oxidase varies, it is customary to express the amount used on the basis of units rather than weight. As used herein, a unit of galactose oxidase may be defined as that quantity of galactose oxidase that will give the activity equivalent to one unit of glucose oxidase as defined by D. Scott in Journal of Agriculture and Food Chemistry, 1, 727 (1953). However, for the sake of convenience, when used hereinafter for proportion comparisons, it will be assumed that the galactose oxidase has an activity of 120,000 units/gram.

As noted above, it has now been found that the enzymatic galactose test compositions described herein may be stabilized by the inclusion of either glucose or ascorbic acid or mixtures thereof. For purposes of the present invention, the composition or test device prepared therewith is considered to be unstable if, due to exposure to oxygen, moisture or elevated temperatures, and, of course, combinations of such conditions, the product either discolors or decreases in sensitivity. Is it apparent that such a condition is extremely undesirable when the composition or device is being used to screen fluids for certain minimum or maximum galactose concentrations.

The discovery that glucose effects the stabilization of the present galactose test system is considered to be quite surprising since glucose is a substrate for glucose oxidase. This finding is a further demonstration of the specificity of galactose oxidase for galactose in the present test system since these sugars, glucose and galactose, are closely related.

In utilizing glucose as a stabilizing agent for the present test composition, it has been found that a relatively wide range of glucose concentrations may be utilized but generally a ratio of glucose to galactose oxidase of from about 28:1 to about 34:1 is used. A preferable ratio of glucose to galactose oxidase has been found to be about 30:1. As used herein, all ratios are expressed on a weight to weight basis, the activity of the galactose oxidase being 120,000 units/gram.

In addition to glucose, it has been found that ascorbic acid also exerts a stabilizing influence on the test composition. In contrast to the glucose, however, the amount of ascorbic acid used must be more closely controlled since it has been found that this material also advantageously acts as a means for controlling the sensitivity of the test composition.

The ratio of ascorbic acid to galactose oxidase used may be varied from about 0.05:1 to about 0.15:1. Again, the ratio is expressed on a weight to weight basis, the activity of the galactose oxidase being 120,000 units/gram.

Since glucose does not perform the dual function attributed to ascorbic acid it has been found that these stabilizers, ascorbic acid and glucose, may be advantageously used in combination. In this regard the ascorbic acid is utilized in a concentration amenable to the desired sensitivity of the test composition. Or, more simply put, as the ascorbic acid concentration increases, the sensitivity of the composition decreases and the concentration of ascorbic acid must be adjusted accordingly. By utilizing a combination of stabilizers with only one exerting a desensitizing effect, maximum stability may be achieved without sacrificing the means of controlling the sensitivity of the composition. It is thus preferable to use such a mixture in practicing the present invention. It is apparent that adjusting the ratio of glucose to ascorbic acid depends on the desired sensitivity of the test composition and may easily be accomplished by routine experimentation. The preferable concentration of ascorbic acid thus depends on the sensitivity required of the test composition.

In utilizing the test composition of the present invention, it is preferable to incorporate the composition with a carrier member and utilize this combination as a dip-and-read test device. This is not, however, to be construed as placing any limitation on the physical make-up of the present novel test composition. It will be appreciated that such compositions may be utilized in the form of tablets, powders and solutions, to mention only a few of the various forms thereof. However, in the preferable embodiment of the present invention the test composition is incorporated into and/or upon a bibulous carrier member. This may be achieved by various methods, which include impregnating a bibulous material with a solution of the test composition and thereafter drying the impregnated test device, adhesively fixing to the surface of the carrier a finely divided, dry, intimate mixture of the ingredients, and the like. The preferable mode of preparation is the impregnation of the bibulous carrier with a solution or solutions of the test composition, followed by drying.

When ascorbic acid is utilized as a stabilizer for the compositions of the present invention and such compositions are incorporated with a bibulous carrier by means of an aqueous solution impregnation, it will be appreciated that a certain risk is involved since ascorbic acid is relatively unstable in aqueous solution. It has therefore been found that a two solution impregnation technique is a preferable mode of preparing such dip-and-read devices. In this two solution impregnation technique, the bibulous carrier is first impregnated with a solution of ascorbic acid in a non-aqueous solvent and the solvent removed therefrom. The ascorbic acid containing carrier is then impregnated with a solution of the remaining constituents including the glucose if desired, and the thus impregnated carrier again dried. The non-aqueous solvents useful in the first impregnation are those in which ascorbic acid is soluble and stable. Such solvents include, ethyl alcohol, methyl alcohol and the like. The preferable solvent has been found to be ethyl alcohol.

When a two solution impregnation technique is employed in conjunction with a bibulous carrier, it has been found that a non-aqueous solution of from about 0.0025% by weight to about 0.010% by weight of ascorbic acid may be utilized. Again, the preferable concentration of ascorbic acid depends on the desired sensitivity of the test device.

When a bibulous carrier is employed the carrier material may be any of a variety of substances. For example, filter paper, wood strips, synthetic plastic fibrous materials, non-woven or woven fabrics and so on, may be utilized in this embodiment. The preferable bibulous material is filter paper having a thickness of about 0.01 inch to 0.02 inch. Moreover, the bibulous material may be used in conjunction with a semi-rigid plastic backing material.

The mode of use of the test device, using the impregnated bibulous carrier will now be described. In conducting the test for galactose, the device is immersed in the fluid being tested and immediately withdrawn. This is done since the pH of the moistened device must be dominated by the buffer in the test composition. If the test device were allowed to remain in the fluid for any length of time, there would be a danger that the test composition ingredients would be leached from the carrier into the fluid. The color developed due to the presence of galacose is then read by its visual appearance or by comparison with a color chart. Various instrumental methods may also be employed to determine the quality of the color developed, thus increasing the accuracy of the test by removing the subjective determination of color by the human eye.

Example 1

An aqueous solution of a test composition was prepared by first mixing 5.0 ml. of 0.3 M phosphate buffer (5.0 g. $Na_3PO_4 \cdot 12H_2O$ and 2.4 g. $NaH_2PO_4 \cdot H_2O$—q.s. to 100 ml. with $H_2O$) having a pH of 8.1 with 5.0 ml. of water and dissolving 100 mg. of galactose oxidase (120,000 units/gram) therein. The following was then added to the buffer-galactose solution: 5.0 ml. of an aqueous solution of 1 mg./ml. peroxidase, 0.05 ml. of a 2% ethyl alcohol solution of bis(2-ethylhexyl) sodium sulfosuccinate, 5.0 ml. of ethyl alcohol, 25.0 ml. of a 10% polyvinylalcohol (Du Pont 51–05) (thickening agent) and 5.0 ml. of a 1% aqueous solution of o-tolidine dihydrochloride. The resultant solution had a pH of about 7.0. The lower portions of bibulous filter paper strips were then dipped into the above prepared solution and dried in a stream of air at about 60° C. The result was a light cream colored strip.

In order to determine the stability of these test devices, a quantity of the strips were placed in a small screw cap bottle, a silica gell desiccant package added and the closed bottles placed in a 50° C. oven for about 19 hours. These heat subjected strips were termed "stressed" samples while those not subjected to these heat tests were termed "unstressed" samples.

Upon removal from the oven a representative number of the stressed samples and, as a control, a number of the unstressed samples were dipped into urine containing about 0.3% by weight galactose. Similarly, stressed and unstressed samples were dipped into urine containing no galactose. After one minute of color development, the difference between the color developed by contacting the test strips with the positive and negative galactose containing urine was determined on a Gardner color difference meter. This instrument enables the obtention of an objective numerical value for the difference between surface colors. See ASTM (American Society for Testing Materials) Test Method D 1365–60T.

There was an average loss of about 70% reactivity in the stressed sample as compared to the unstressed sample.

Example 2

This example shows the stablizing effect of ascorbic acid on the test compositions of the present invention. Test strips were prepared as in Example 1 except that the 5.0 ml. of ethyl alcohol in the test composition solution was replaced with 3 ml. of ethyl alcohol and 2.0 ml. of a 1.6 mg./ml. aqueous solution of ascorbic acid.

These test strips were then subjected to the heat tests and tested for reactivity as in Example 1.

The stressed samples containing the ascorbic acid showed only a 21% loss in reactivity when compared to unstressed samples containing ascorbic acid. This compares to a 70% loss in reactivity in a comparable formulation which excluded ascorbic acid.

Example 3

This example shows the stabilizing effect of glucose on the compositions of the present invention. Test strips were prepared as in Example 1 except that in the test composition solution, 1.0 g. of glucose was used in place of the 5.0 ml. of ethyl alcohol.

These test strips containing the glucose were subject to heat stressing at 50° C. for about 16 hours and tested for reactivity as in Example 1.

The stressed test strips containing the glucose showed a 50% loss in reactivity when compared to the unstressed samples.

Example 4

This example is included for comparison purposes to show the inoperability of other sugars as stabilizers for the compositions of the present invention.

Test strips were prepared as in Example 3 except that 1.0 g. of sucrose was substituted for the glucose.

Upon testing for reactivity as in Example 3, the stressed test strips showed a 90% loss in reactivity compared to the unstressed samples. This compares to a 50% loss in reactivity of the glucose-containing stressed samples.

In summary, the present invention provides a novel, improved test combination and method for detecting galactose in fluids. This test composition comprises galactose oxidase, a hydrogen peroxide detection system and a novel system utilizing glucose, ascorbic acid and mixtures thereof for stabilizing the test composition.

What is claimed is:

1. A test composition for the detection of galactose in fluids comprising:
   (A) galactose oxidase;
   (B) a substance having peroxidative activity;
   (C) an indicator material which is responsive to hydrogen peroxide in the presence of the substance having peroxidative activity;
   (D) a buffer effective to maintain the above ingredients in a pH range of from about 5.5 to 8.0 when contacted with the fluid being tested; and
   (E) as a stabilizer for the test composition, an effective amount of a member selected from the group consisting of ascorbic acid, glucose and mixtures thereof.

2. A test composition as in claim 1 wherein the stabilizer is glucose.

3. A test composition as in claim 1 wherein stabilizer is ascorbic acid.

4. A test composition as in claim 1 wherein the stabilizer is a mixture of glucose and ascorbic acid.

5. A test composition as in claim 1 incoporated with a carrier member.

6. A process for stabilizing a test composition for the detection of galactose in fluids which comprises adding an effective quantity of a stabilizer selected from the group consisting of glucose, ascorbic acid and mixtures thereof to a composition comprising:
   (A) galactose oxidase;
   (B) a substance having peroxidative activity;
   (C) an indicator material which is responsive to hydrogen peroxide in the presence of the substance having peroxidative activity;
   (D) a buffer effective to maintain the above ingredients in a pH range of from about 5.5 to 8.0 when contacted with the fluid being tested.

7. A process as in claim 6 wherein the stabilizer is glucose.

8. A process as in claim 6 wherein the stabilizer is ascorbic acid.

9. A process as in claim 6 wherein the stabilizer is a mixture of glucose and ascorbic acid.

10. A process as in claim 6 wherein the test composition is incorporated with a carrier member.

11. A process for preparing a stabilized galactose test device which comprises impregnating a bibulous carrier with a first solution of an effective quantity of ascorbic acid as a stabilizer in a non-aqueous solvent, removing the solvent therefrom and thereafter impregnating the carrier with a second aqueous solution comprising:
   (A) galactose oxidase;
   (B) a substance having peroxidative activity;
   (C) an indicator material which is responsive to hydrogen peroxide in the presence of the substance having peroxidative activity; and
   (D) a buffer effective to maintain the above ingredients in a pH range of from about 5.5 to 8.0 when contacted with the fluid being tested,
and thereafter removing the aqueous portion thereof.

12. A process as in claim 11 wherein the second impregnating solution additionally comprises a stabilizing quantity of glucose.

13. A process as in claim 11 wherein the non-aqueous solvent is an alcohol.

14. A process as in claim 13 wherein the alcohol is ethyl alcohol.

References Cited

UNITED STATES PATENTS 3,367,842  2/1968  Rupe et al. _____ 195—103.5

ALVIN E. TANEHOLTZ, *Primary Examiner.*